United States Patent Office 2,783,446
Patented Feb. 26, 1957

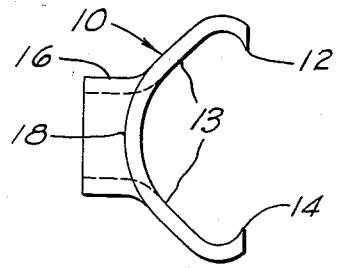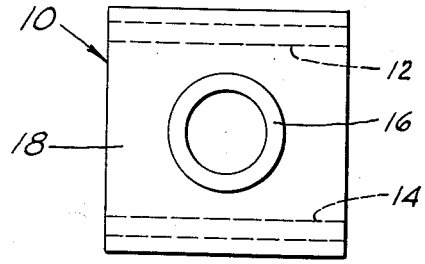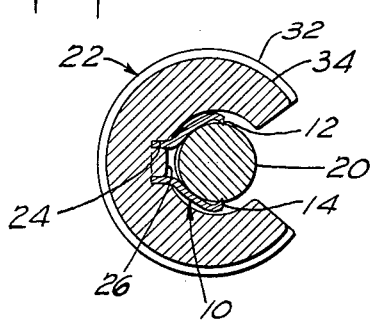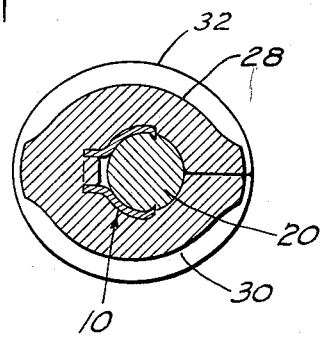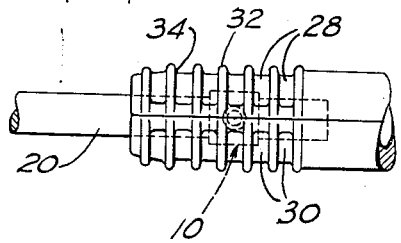
INVENTORS
HENRY P. DUPRE
AND PETER GRECO
BY
ATTORNEY

2,783,446

CONDUCTIVE LOCKING ELEMENT

Henry P. Dupre, Wilton, and Peter Greco, Norwalk, Conn., assignors to Burndy Corporation, a corporation of New York Application August 11, 1954, Serial No. 449,047

2 Claims. (Cl. 339—276)

Our invention relates to a locking element, and more particularly to means for electrically and mechanically securing a hard metal wire to a malleable connector.

Hitherto, solid hard drawn electric wire, when crimped in a malleable connector, could not be gripped firmly enough to resist the torque normally applied when making a service or field installation.

The principal object of our invention is to provide an improved locking element positioned between the wire and a crimped connector to prevent movement therebetween; to provide an element which is relatively inexpensive, easy to install without tools, and which will provide an increased electrical conductivity over former methods.

These and other objects of our invention are accomplished and our new results obtained as will be apparent from the device described in the following specification, particularly pointed out in the claims, and illustrated in the accompanying drawing, in which:

Fig. 1 is a side elevation of our locking element.

Fig. 2 is a front view thereof.

Figs. 3 and 4 are cross-section views of the element in a connection before and after crimping.

Fig. 5 is a plan view of the crimped connection.

As is illustrated in the drawing, our invention comprises a one-piece C-shaped element 10 having sharp edges 12 and 14 along the open ends. A short tubing 16 is formed outwardly from the back side 18. The element is made of non-rusting hard material that is conductive, such as beryllium copper. It may be tin plated to prevent corrosion.

The sharp edges 12 and 14 serve to bite into the conductor 20, thereby offering greater resistance to twist. The tubing 16 is driven into the malleable C-shaped connector 22, as at 24, to permit seating of the element 10 therein. The conductor 20 is then placed inside the element. The displaced connector material 26 is forced into the tubing 16 to anchor the element securely in position. When the malleable connector is securely crimped, as at 28 and 30 in Fig. 4, the hard drawn wire is securely gripped by the element firmly enough to resist any torque or twist between the conductor and the connector. As is evident, the invention is attached without the use of additional parts or fastening devices.

The connector may be formed with ridges 32 and intermediate seats 34 to provide locating positions for the crimping tool during the installation.

We have thus described our invention, but we desire it understood that it is not confined to the particular forms or uses shown and described, the same being merely illustrative, and that the invention may be carried out in other ways without departing from the spirit of our invention, and therefore, we claim broadly the right to employ all equivalent instrumentalities coming within the scope of the appended claims, and by means of which, objects of our invention are attained and new results accomplished, as it is obvious that the particular embodiments herein shown and described are only some of the many that can be employed to attain these objects and accomplish these results.

We claim:

1. In combination for use with an electrical conductor, a C-shaped connector made of soft malleable metal and a locking device for securing the conductor to the connector, said locking device made of hard metal having a conductor biting surface whereby the locking device may be made secure to the conductor, means on said locking device projecting into the conductor body for securing the same to said C-shaped connector, said C-shaped connector being deformable to encircle the conductor with the locking device therein.

2. A method of assembly of an electrical connection which comprises inserting a metal locking device having a biting surface into a soft malleable C-shaped metal connector body and projecting the same into the wall thereof, thereafter encircling said connector body and locking device about an electrical conductor, and thereafter simultaneously deforming the connector body and locking device to the conductor whereby the connector body and locking device form a unitary connection with the conductor.

References Cited in the file of this patent

UNITED STATES PATENTS

| 1,619,517 | Hughes | Mar. 1, 1927 |
| 1,631,719 | Chandler | June 7, 1927 |
| 1,976,929 | Elliott | Oct. 16, 1934 |
| 2,275,163 | Thomas | Mar. 3, 1942 |
| 2,329,653 | Rogoff | Sept. 14, 1943 |
| 2,487,917 | Adams | Nov. 15, 1949 |
| 2,534,881 | Schroeder | Dec. 19, 1950 |
| 2,576,528 | Matthysse | Nov. 27, 1951 |
| 2,627,649 | Matthysse | Feb. 10, 1953 |